United States Patent [19]

Watson et al.

[11] Patent Number: 5,574,989
[45] Date of Patent: Nov. 12, 1996

[54] TIME DIVISION MULTIPLE ACCESS CELLULAR COMMUNICATION SYSTEM AND METHOD EMPLOYING BASE STATION DIVERSITY TRANSMISSION

[75] Inventors: John Watson, Carlsbad, Calif.; Youngky Kim, Potomac, Md.; Long Huynh; Michael Parr, both of San Diego, Calif.

[73] Assignee: Hughes Electronics, Los Angeles, Calif.

[21] Appl. No.: 322,963

[22] Filed: Oct. 13, 1994

Related U.S. Application Data

[63] Continuation of Ser. No. 53,173, Apr. 26, 1993, abandoned.

[51] Int. Cl.[6] ............................................ H04B 7/06
[52] U.S. Cl. ........................ 455/101; 455/52.3; 455/59; 375/347
[58] Field of Search .................... 455/15, 33.1, 33.3, 455/52.3, 52.1, 56.1, 65, 59, 101, 103; 375/33, 40, 100, 103, 99, 101, 347, 350, 346, 348

[56] References Cited

U.S. PATENT DOCUMENTS

| | | | |
|---|---|---|---|
| 4,896,371 | 1/1990 | Kahn | 455/103 |
| 5,203,018 | 4/1993 | Hirose | 455/101 |
| 5,319,677 | 6/1994 | Kim | 375/94 |

FOREIGN PATENT DOCUMENTS

| | | | |
|---|---|---|---|
| 0459823 | 12/1991 | European Pat. Off. | 375/100 |
| 0197929 | 11/1983 | Japan | 455/59 |
| 0286027 | 11/1988 | Japan | 455/65 |

*Primary Examiner*—Andrew Faile
*Assistant Examiner*—Doris To
*Attorney, Agent, or Firm*—Gordon R. Lindeen, III; Wanda K. Denson-Low

[57] ABSTRACT

A cellular base station (10) in a digital cellular system employs transmitting circuitry in which voice signals (15) are processed at a low frequency level (12) into two separate paths. A first of the low frequency signals is variably delayed (20), and the first and the other low frequency signals are upconverted to radio frequency level (16,22) for transmission over independent time-spaced transmission paths (26, 28) to cellular receivers. A receiver downconverts and demodulates the radio frequency diversity signals, and then combines the demodulated diversity signals to generate an equalized combination diversity signal for receiver output processing.

21 Claims, 3 Drawing Sheets

TIME DIVISION MULTIPLE ACCESS CELLULAR COMMUNICATION SYSTEM AND METHOD EMPLOYING BASE STATION DIVERSITY TRANSMISSION

This is a continuation application Ser. No. 08/053,173, filed Apr. 26, 1993, now abandoned.

The present invention relates to cellular communication systems and methods, and, more particularly, to such systems and methods in which base station diversity transmission is employed to provide improved system performance.

In cellular telephone communication systems, radio communication occurs between fixed equipment at a base station (cell sites) and mobile units within the cell. The signal path from the base to the mobile units is referred to as the "forward" path, while that in the opposite direction is the "reverse" path. Cellular systems are limited by the capability of mobile telephones to receive information in the presence of interference. The key performance measure is the minimum ratio of signal power to interference power that permits acceptable communication quality.

In accordance with Telecommunications Industry Association (TIA) standards, an equalizer is required to be integrated into the mobile unit circuitry. The equalizer must be capable of operating well when receiving signals through two distinct paths separated in time by up to 41 µS (a symbol duration). The intent of the equalizer is to mitigate the effects of delay spread as it arises in the transmission environment of cellular telephones. Delay spread is the period over which a signal transmitted at an instant is spread over time by the communication channel.

For appropriate equalizer architectures, excellent performance occurs when the channel exhibits particular characteristics. Specifically, the equalizer performs very well when the channel appears to have consisted of two paths of equal average power, separated in time by a symbol duration. This improved performance results from a combination of two factors: (a) the diversity between the two paths (i.e., the low probability that they will fade simultaneously relative to the individual probabilities of fading), and (b) the minimal level of Inter-Symbol Interference (ISI) that occurs when the paths are separated by exactly a symbol duration.

In typical operating environments, it is possible that paths with the desired characteristics will occur naturally. Unfortunately, such circumstances rarely arise, and delay spreads are typically negligible in comparison to the symbol duration.

Moreover, in previous system base station equipment, diversity reception is typically used to improve mobile-to-base (reverse) channel performance. Without some means of enhancing performance in the base-to-mobile (forward) direction, therefore, asymmetry may arise in the performance of the respective channels in prior art cellular systems.

SUMMARY OF THE INVENTION

The present invention is accordingly directed to a cellular communication system in which forward communication quality is improved with a significantly reduced minimum acceptable signal-to-interference power ratio.

The invention artificially creates two, suitably arranged paths during transmission from the base station which results in significant performance improvement for almost any cellular system.

A cellular communication system comprises a base station having means for generating a first low frequency signal corresponding to an input voice signal, means for processing the first low frequency signal to form a first radio frequency signal corresponding thereto and a second radio frequency signal corresponding thereto. Means are provided for time delaying the second radio frequency signal relative to the first radio frequency signal and for transmitting the first and second radio frequency signals over independent transmission paths. The system further comprises at least one receiver having means for downconverting and demodulating the first and second radio frequency signals to generate downconverted diversity signals. Means are provided for demodulating the downconverted diversity signals to generate demodulated diversity signals. Equalizing means are employed in the receiver to combine the demodulated diversity signals and generate an equalized combination diversity signal for receiver output processing.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings.

DESCRIPTION OF THE INVENTION

Figure 1:
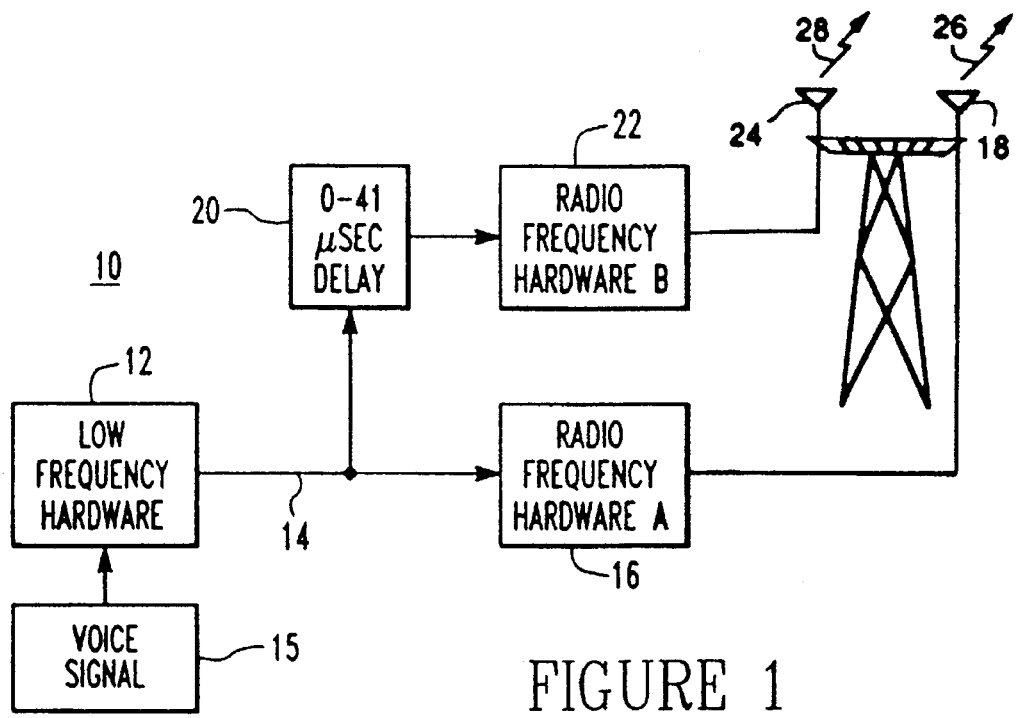
FIG. 1 is a block diagram representing a cellular base station arranged to provide forward diversity transmission to mobile receivers in accordance with the present invention.

A block diagram of the preferred embodiment of the invention is shown in FIG. 1. Thus, a digital cellular base station 10 operates in a cellular, time division multiplex access (TDMA) system and includes low frequency hardware 12 that receives an input signal 15 for transmission. The low frequency hardware 12 digitally processes the input signal 15 to generate a low frequency analog output 14.

At a predetermined point in the transmission circuitry, the processed input signal is divided into two paths. In the preferred embodiment, the signal division is done while the signal is at low frequencies. In other applications of the invention, signal division can be performed at an upconverted frequency level, such as the radio frequency level.

Accordingly, in the preferred embodiment, the low frequency signal output 14 is directly applied through a first circuit channel to radio frequency hardware 16 for upconversion to radio frequency, power amplification and transmission from an antenna 18. In addition, the low frequency signal output 14 is applied to a time delay circuit 20, which can operate with a fixed time delay but operates in the preferred embodiment with a selectable variable time delay up to 41 microseconds in a second circuit channel.

In turn, the delayed, low frequency signal output is applied from the time delay circuit 20 to radio frequency hardware 22 for upconversion, power amplification and transmission from an antenna 24 that may be suitably located in spaced relation on the same tower as the antenna 18. Alternatively, separate towers can be provided for the antennas 18 and 24. Generally, in accordance with the invention, time spaced signals 26 and 28 are transmitted to achieve relatively good independence between the signal transmission paths, i.e. to achieve relatively good signal diversity based on transmitted signals with prestructured time separation and transmission path independence.

Figure 2:
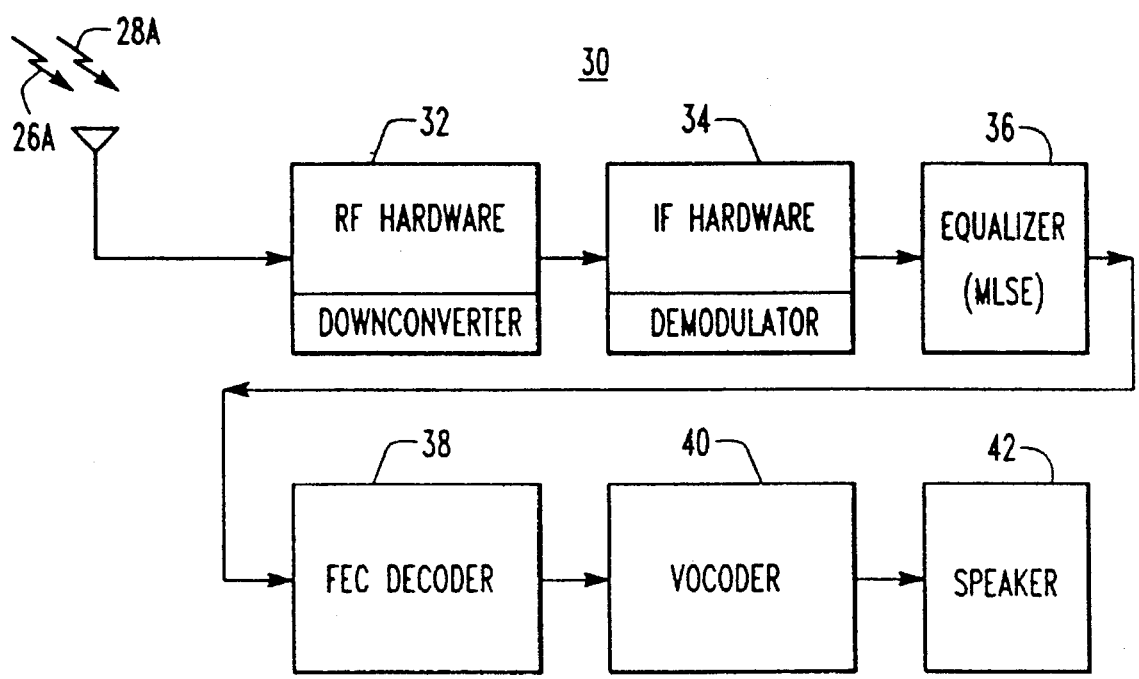
FIG. 2 is a block diagram of a mobile cellular receiver that receives signals from the base station of FIG. 1 in accordance with the invention.

To achieve transmission path independence, the signals 26 and 28 are transmitted to traverse different paths to the mobile receiver. Thus, path independence is achieved by transmitting the signals through physically separated antennas as described hereinabove, or by an appropriate electronic (or other) technique such as polarization variation. Accordingly, the signal 26 and the signal 28, which is delayed, are transmitted as diversity signals with intentionally structured time separation to a digital mobile telephone receiver 30 (FIG. 2) in the station reception area.

The transmitted signals 26 and 28 are received as diversity signals 26A and 28A which are respectively at least slightly different from the transmitted signals 26 and 28 due to channel conditions. The received signals 26A and 28A are summed and applied to radio frequency hardware 32 that processes the signals 26A and 28A to separate and down-convert them for application to intermediate frequency (IF) hardware 34.

The signals are demodulated by the IF hardware 34 and coupled to an equalizer 36, which is required to be integrated into mobile receivers under TIA standards. After equalization, conventional signal processing is provided by a forward error correcting (FEC) decoder 38 and a vocoder 40 that is coupled to a speaker 42.

The equalizer 36 in the present embodiment is a maximum likelihood sequential estimator that conventionally operates on diversity signals that are delayed by natural channel conditions. As previously indicated, equalizer performance improves the quality of reception through reduction of error rates when there are two uncorrelated, time-separated fading paths, and especially when the delay between the paths is a symbol duration.

In accordance with the present invention, the equalizer 36 also is intended to operate on diversity signals that are time separated relative to each other by circuitry in the base station 10 prior to transmission as described hereinabove. Generally, the equalizer 36 resolves the artificially imposed delay spread by first separating the two independent fading signals summed at the receiving antenna and then optimally combining the signals in a manner like that applied to conventional diversity signals.

Accordingly, mobile receiver performance is enabled to be improved through an artificial creation of two time-separated signal paths from a base station.

As a matter of perspective on the present invention, studies (e.g., '90-MHz Multipath Propagation Measurements for U.S. Digital Cellular Radiotelephone', Rappaport, T. S., Seidel, S. Y., and Singh, R., IEEE Trans. on Vehicular Technology, pp. 132–9, Vol. 39, No. 2, May 1990) indicate that at most 4% of cellular service locations throughout North America exhibit sufficient delay spread to justify the use of an equalizer. In concept, the present invention is especially applicable to operation within the remaining 96% of service locations.

By creating artificial delay spread, total delay spread may exceed the capabilities of the equalizer in areas where significant "natural" delay spread exists. To mitigate the degradation associated with this problem, control over the extent of the introduced delay spread may be employed. Generally, any site may be configured with spreads in the range from 0 to 41 μS according to local conditions.

For high density operation, cell sizes are usually small, i.e., perhaps 1 to 2 km. in radius. In such cases, forward channel signaling is less likely (in comparison to larger cells) to exhibit delay spreads requiring equalization. This is because significant secondary paths must be at least 2 km (i.e., about 6^mS) longer than primary paths to cause a problem that needs to be corrected through equalization. Extensive delay spread is far more probable at greater distances from cell sites. Consequently, in areas where capacity is a severe constraint, the need to apply the present invention is extremely high.

Further, the present invention may be applied by cellular operators in cells with difficult coverage objectives. With full utilization throughout a service area, system capacity can be incremented by close to a factor of two. Alternatively, application may be limited to local high usage areas. In other circumstances, cell operators may choose to use the invention as a means for enhancing perceived service quality, by expanding coverage to encompass a higher proportion of an established service area.

As a result of the creation of distinct, time separated forward transmission paths from the base station to the mobile telephone receiver, the receiver equalizer is enabled to be harnessed in operation to provide significant communication quality improvement.

Figure 3:
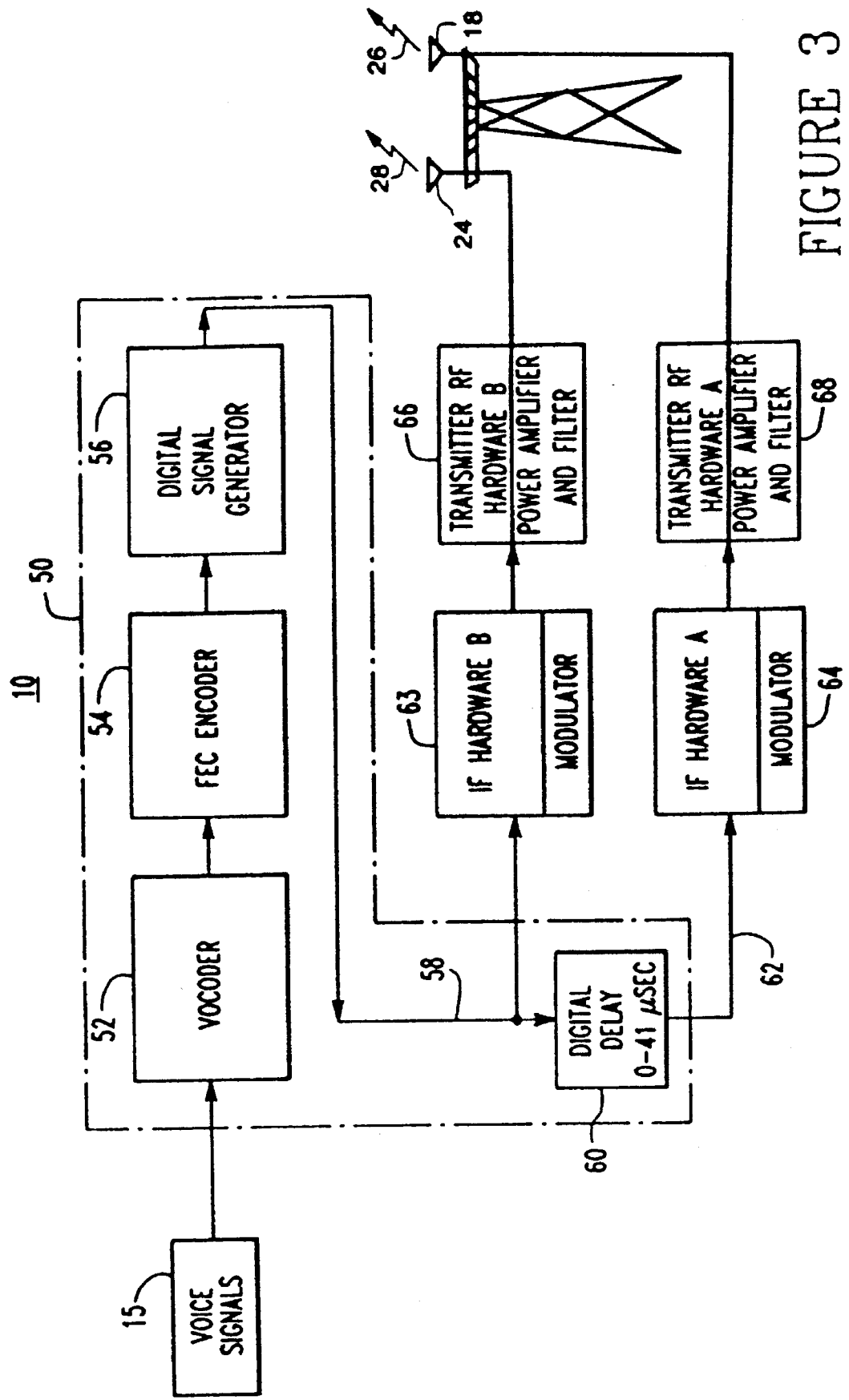
FIG. 3 shows the cellular base station of FIG. 1 in greater block diagram detail.

The base station 10 is shown in greater block detail in FIG. 3. The voice input signal 15 is applied to a digital signal processor (DSP) 50 where it is processed by a software vocoder 52 and then by an FEC software encoder 54.

A software generator 56 operates on the encoded signal to generate a digital signal 58 for output from the DSP 50. The digital signal 58 is applied to IF hardware 63 for modulation onto the station carrier frequency in a B signal channel. Additionally, the digital signal 58 is applied to a software time delay function 60 to generate a time delayed digital signal 62 that is applied to IF hardware 64 for modulation onto the station carrier frequency in an A signal channel.

The modulated B signal and the time-delayed and modulated A signal are respectively applied to transmitter hardware 66 and 68 for transmission from the antennas 24 and 18 as time separated signals over diversity transmission paths as previously described.

INVENTION PERFORMANCE EVALUATION

Figure 4:
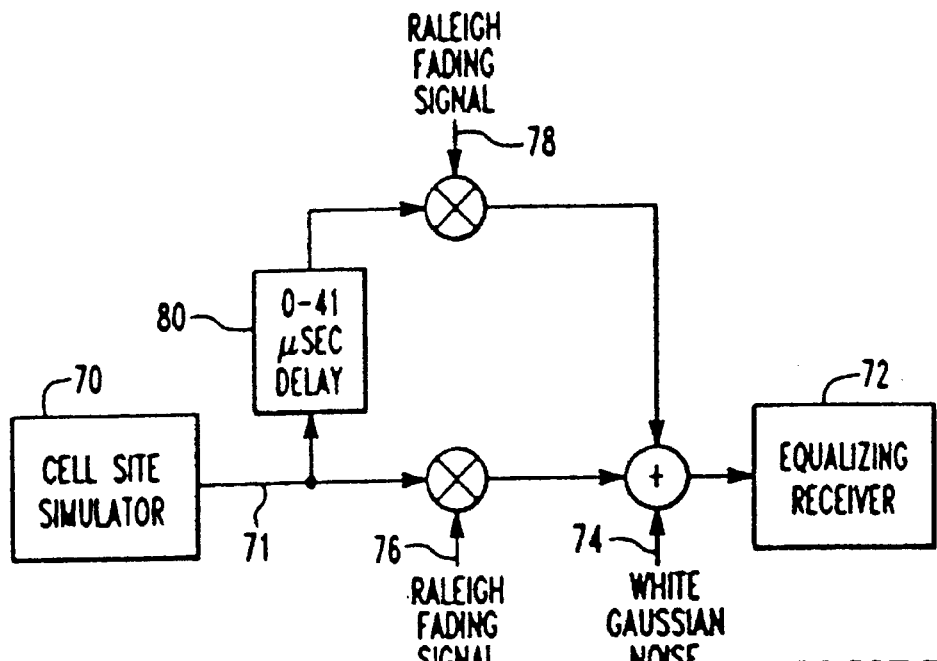
FIG. 4 illustrates a configuration used to evaluate cellular system performance with the use of forward diversity transmission in accordance with invention.

Practical evaluation of the advantages of the present invention has been performed in a laboratory environment as illustrated in FIG. 4. Using a single transmitter with a channel simulator 70 which creates two independent paths, the performance of a cellular system employing the invention was evaluated.

Performance of an equalizer receiver 72 was evaluated in the presence of interference and/or noise, i.e., in the presence of Additive White Gaussian Noise (AWGN) 74. The carrier-to-noise (C/N) ratios used represent the ratio of the total signal power (summed from the two paths) to the noise power in a 24.3 kHz bandwidth (which corresponds to the symbol rate). Signals 71 transmitted by the cell site were multiplied by a varying complex input representative of a Rayleigh fade 76 at 20 MPH with an 870 Mhz carrier. The signals 71 were also delayed by a delay circuit 80, and the delayed signals were multiplied by a similar, but uncorrelated, complex fading input 78. The delay was varied up to a symbol duration (41 μS). The sum of the resulting signals was then added to noise (AWGN) 74 before being applied to the mobile receiver 72 under test.

Figure 5:
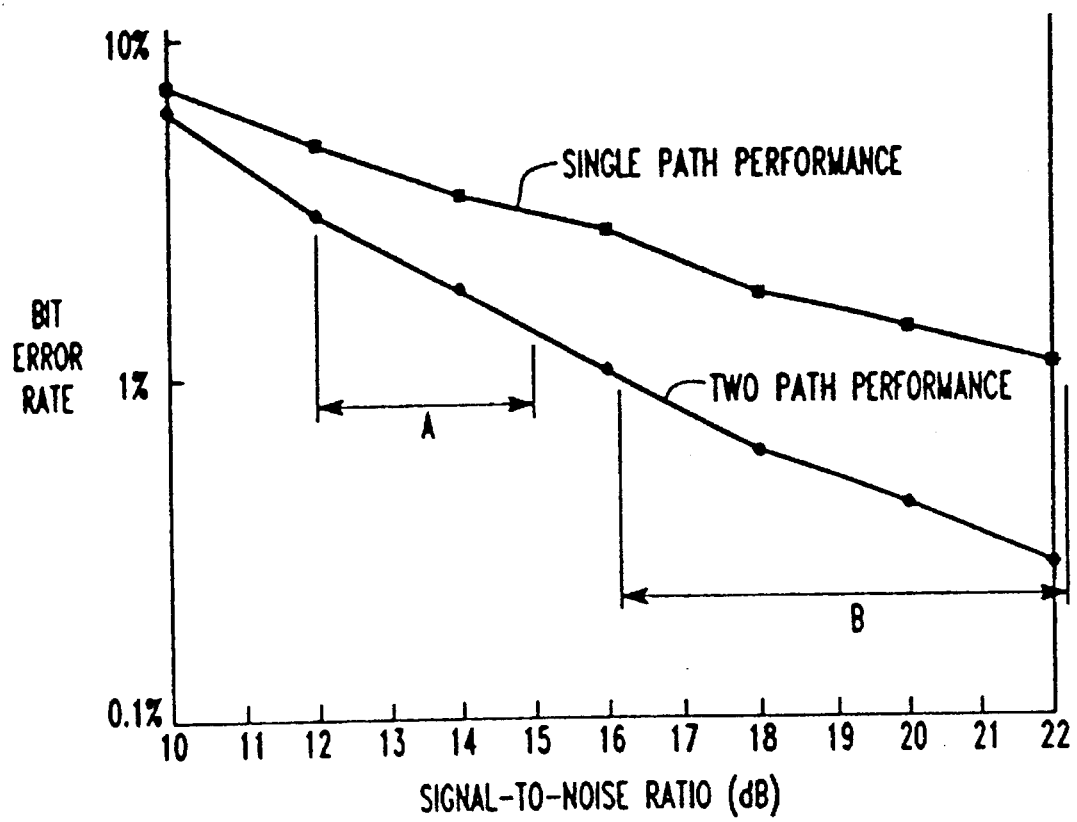
FIG. 5 graphically illustrates the experimental results.

Under these conditions, the results presented in FIG. 5 were observed. Voice quality was acceptable when channel Bit Error Rates (BERs) are less than or equal to about 3%. At a channel BER of 3%, the diversity gain associated with using the delayed signal was about 3 dB (marked 'A' in FIG. 5). That is, with 3 dB less signal-to-noise ratio, the same performance was achieved. At a channel BER of 1% the experimental advantage was close to 6 dB (marked 'B').

GENERAL ADVANTAGES OF THE INVENTION

The present invention provides significant advantages in cellular communication systems having the time division multiple access architecture. These advantages stem from the implementation of time separated transmission paths from a base station to a mobile receiver in which the diversity signals are combined to provide higher quality reception.

Generally, cellular systems are limited by the capability of mobile telephones to receive information in the presence of interference. The key performance measure is the minimum ratio of signal power to interference power that permits acceptable communications quality. The invention permits a sizable decrease in this ratio. Accordingly, with use of the present invention, system performance is improved in locations where quality is otherwise marginal, or, alternatively, system capacity may be increased. A sizeable decrease is provided in the minimum ratio of signal power to interference power.

Diversity reception is typically used to improve mobile-to-base (reverse) channel performance. With use of the present invention, performance is enhanced in the base-to-mobile (forward) direction. As a result, asymmetry is avoided in the performance of the forward and reverse respective channels in cellular systems.

The foregoing description of the preferred embodiment has been presented to illustrate the invention. It is not intended to be exhaustive or to limit the invention to the form disclosed.

In applying the invention, modifications and variations can be made by those skilled in the pertaining art without departing from the scope and spirit of the invention. It is intended that the scope of the invention be defined by the claims appended hereto, and their equivalents.

What is claimed is:

1. A communication system comprising:

a base station having:

means for generating a first low frequency signal corresponding to an information signal;

means for processing the first low frequency signal to form a first radio frequency signal corresponding thereto and a second radio frequency signal corresponding thereto;

means for time delaying the second radio frequency signal relative to the first radio frequency signal;

means for transmitting the first and second radio frequency signals over independent transmission paths; and at least one receiver having:

means for receiving and summing the transmitted first and second radio frequency signals;

means for separating and downconverting the summed first and second radio frequency signals to generate downconverted time diversity signals;

means for demodulating the separated downconverted diversity signals to generate separate demodulated time diversity signals; and equalizing means for combining the separate demodulated time diversity signals to generate an equalized combination signal for receiver output processing.

2. The communication system of claim 1 wherein:

the transmitting means includes respective antennas for the respective first and second radio frequency signals spaced from each other on a single tower to create independent transmission paths.

3. The communication system of claim 1 wherein a digital signal processor is provided and includes at least the generating means and the time delaying means.

4. The communication system of claim 1, wherein said means for time delaying the second radio frequency signal relative to the first radio frequency signal includes means for varying the delay between the second radio frequency signal and the first radio frequency signal.

5. The communication system of claim 4 wherein a digital signal processor is provided and includes at least the generating means and the time delaying and varying means.

6. The communication system of claim 1, wherein said means for processing the first low frequency signal to form a first radio frequency signal corresponding thereto and a second radio frequency signal corresponding thereto includes means for forming a second low frequency signal from the first low frequency signal to form said second radio frequency signal corresponding to said second low frequency signal, and said means for time delaying the second radio frequency signal relative to the first radio frequency signal further comprises means for time delaying said second low frequency signal relative to said first low frequency signal, whereby the time delay in the second radio frequency signal corresponds to the time delay in the second low frequency signal.

7. The communication system of claim 6 wherein said means for time delaying said second low frequency signal relative to said first low frequency signal includes means for varying the delay between the second low frequency signal and the first low frequency signal.

8. A method for operating a communication system having a base station and at least one receiver, the steps of the method comprising:

generating a first low frequency signal corresponding to an input information signal;

processing the first low frequency signal to form a first radio frequency signal corresponding thereto and a second radio frequency signal corresponding thereto;

time delaying the second radio frequency signal relative to the first radio frequency signal;

transmitting the first and second radio frequency signals from the base station over independent transmission paths;

receiving and summing the first and second radio frequency signals in the at least one receiver;

separating and downconverting the summed first and second radio frequency signals to generate downconverted time diversity signals;

demodulating the separated downconverted diversity signals to generate separate demodulated diversity signals; and combining the separate demodulated diversity signals in an equalizer to generate an equalized combination signal for receiver output processing.

9. The method of claim 8 wherein:
the signal transmitting step is performed with respective antennas for the respective first and second radio frequency signals spaced from each other on a single tower to create independent transmission paths.

10. The method of claim 8, wherein the time delaying step includes the step of varying the delay between the second radio frequency signal and the first radio frequency signal.

11. The method of claim 10 wherein the generating step, the time delaying step and the delay varying step are performed in a digital signal processor.

12. The method of claim 8, wherein the processing step includes the step of forming a second low frequency signal from the first low frequency signal to form said second radio frequency signal corresponding to said second low frequency signal, and wherein the time delaying step includes the step of time delaying said second low frequency signal relative to said first low frequency signal, whereby the time delay in the second radio frequency signal corresponds to the time delay in the second low frequency signal.

13. A communication system comprising:
a base station having:
means for generating a first low frequency signal corresponding to an input information signal;
means for processing the first low frequency signal to form a first radio frequency signal corresponding thereto and a second radio frequency signal corresponding thereto;
means for time delaying the second radio frequency signal relative to the first radio frequency signal;
means for transmitting the first and second radio frequency signals over independent transmission paths; and
at least one receiver having:
means for receiving and summing the transmitted first and second radio frequency signals;
means for separating and downconverting the summed first and second radio frequency signals to generate downconverted diversity signals;
means for demodulating the downconverted diversity signals to generate demodulated diversity signals; and
equalizing means including a maximum likelihood sequential estimator for combining the demodulated diversity signals to generate an equalized, high-quality combination signal for receiver output processing.

14. The communication system of claim 13, wherein said means for time delaying the second radio frequency signal relative to the first radio frequency signal includes means for varying the delay between the second radio frequency signal and the first radio frequency signal.

15. The communication system of claim 14, wherein a digital signal processor is provided and includes at least the generating means and the time delaying and varying means.

16. The communication system of claim 13, wherein said means for processing the first low frequency signal to form a first radio frequency signal corresponding thereto and a second radio frequency signal corresponding thereto includes means for forming a second low frequency signal from the first low frequency signal to form said second radio frequency signal corresponding to said second low frequency signal, and said means for time delaying the second radio frequency signal relative to the first radio frequency signal further comprises means for time delaying said second low frequency signal relative to said first low frequency signal, whereby the time delay in the second radio frequency signal corresponds to the time delay in the second low frequency signal.

17. The communication system of claim 16, wherein said means for time delaying said second low frequency signal relative to said first low frequency signal includes means for varying the delay between the second low frequency signal and the first low frequency signal.

18. A method for operating a communication system having a base station and at least one receiver, the steps of the method comprising:
generating a first low frequency signal corresponding to an input information signal;
processing the first low frequency signal to form a first radio frequency signal corresponding thereto and a second radio frequency signal corresponding thereto;
time delaying the second radio frequency signal relative to the first radio frequency signal;
transmitting the first and second radio frequency signals from the base station over independent transmission paths;
receiving and summing the first and second radio frequency signals in the at least one receiver;
separating and downconverting the summed first and second radio frequency signals to generate downconverted diversity signals;
demodulating the downconverted diversity signals to generate demodulated diversity signals; and
combining the demodulated diversity signals in an equalizer which uses a maximum likelihood sequential estimator to generate an equalized, high-quality combination signal for receiver output processing.

19. The method of claim 18, wherein the time delaying step includes the step of varying the delay between the second radio frequency signal and the first radio frequency signal.

20. The method of claim 18, wherein the processing step includes the step of forming a second low frequency signal from the first low frequency signal to form said second radio frequency signal corresponding to said second low frequency signal, and wherein the time delaying step includes the step of time delaying said second low frequency signal relative to said first low frequency signal, whereby the time delay in the second radio frequency signal corresponds to the time delay in the second low frequency signal.

21. The method of claim 20, wherein the time delaying step includes the step of varying the delay between the second low frequency signal and the first low frequency signal.

\* \* \* \* \*